Feb. 10, 1953　　　　F. S. FARLEY　　　　2,627,630
INJECTION MOLDING MACHINE
Filed Feb. 25, 1950　　　　　　　　　　　　　　7 Sheets-Sheet 1

Fig. I.

INVENTOR
Francis S. Farley
BY
Kenyon & Kenyon
ATTORNEYS

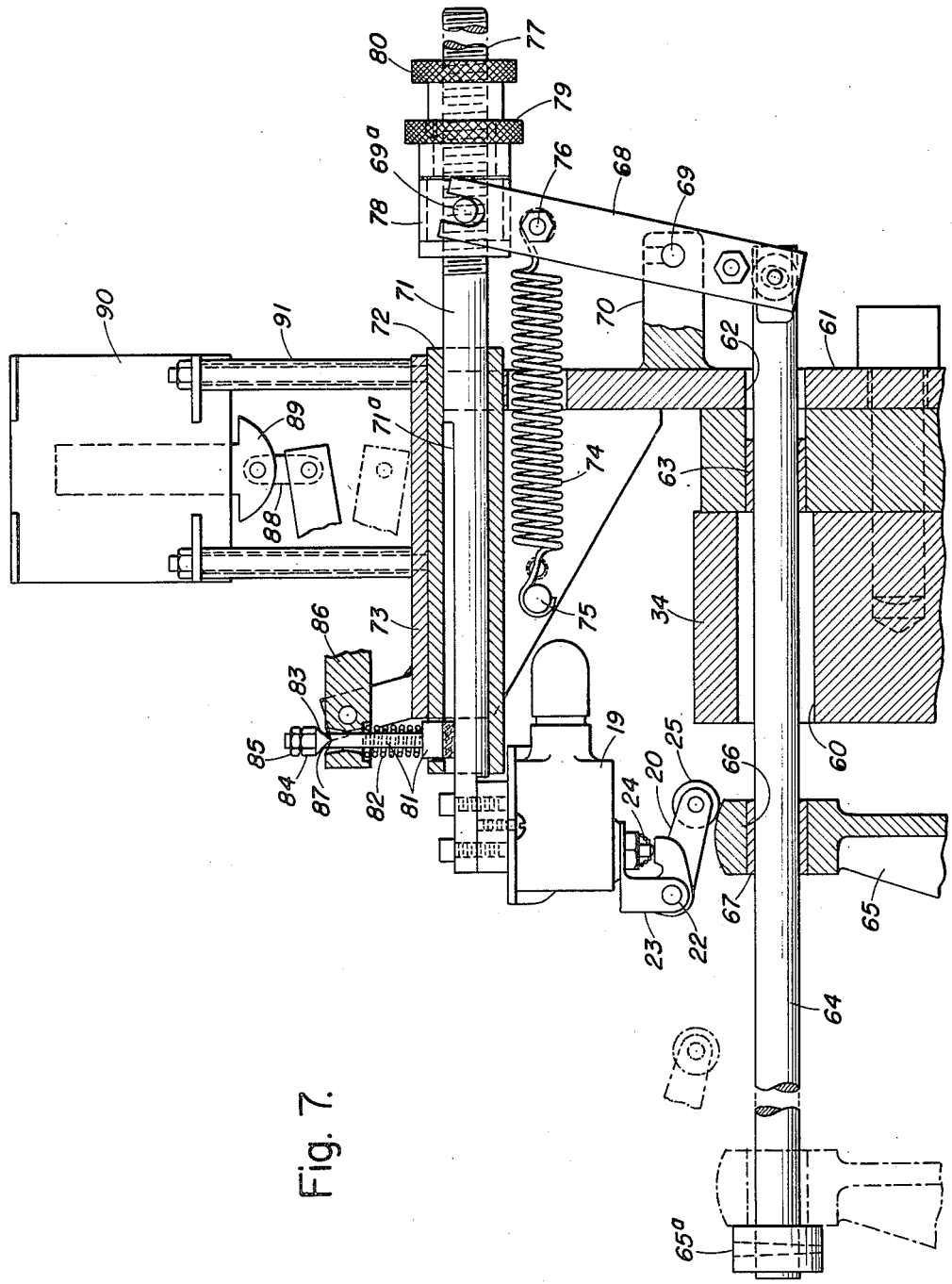

Patented Feb. 10, 1953

2,627,630

UNITED STATES PATENT OFFICE 2,627,630

INJECTION MOLDING MACHINE

Francis S. Farley, Westfield, N. J., assignor to The Watson-Stillman Co., Roselle, N. J., a corporation of New Jersey Application February 25, 1950, Serial No. 146,221

14 Claims. (Cl. 18—30)

1

This invention relates to a molding material feed control for an injection molding machine of the type having an injection cylinder with a side feeding port spaced from its discharge end and with an injection plunger that clears this port more or less on its return stroke. Thus the plunger's limit position on the return stroke determines the volume of the molding material fed into the cylinder to replace the material ejected by the plunger's preceding advance stroke.

Conventionally this type of machine may have the feeding port facing upwardly and provided with a feed hopper in which the molding material in a granular condition is placed for gravitational feeding into the injection cylinder each time the plunger returns to clear the port. The farther backward the plunger goes the greater the volume of the molding material that can flow through the port into the cylinder between the front end of the plunger and the previously loaded molding material in the front end of the cylinder. The front end of the cylinder is provided with heating means which heats the molding material to convert, cure or plasticize this material to a fluent plastic mass that is substantially free from voids, pressure on the material exerted by the plunger sometimes aiding in this conversion. On each advance stroke the plunger pushes the newly fed granular material ahead of it and through it exerts pressure on the fluent plastic mass resulting from previously fed material. The material is successively ejected into a mold shaped to produce the desired product. This fixes the volume of material ejected as successive charges from the cylinder and injected into the mold. That is to say, the ejected charges each have a fixed constant volume.

Since the molding material when in its granular condition does not have the physical characteristics of a liquid as it does after curing or plasticizing, the feeding of fixed volumes of the granular molding material into the cylinder to replace the fixed volumes of ejected cured plastic material is frequently unsatisfactory. That is to say a given volume of the granular molding material does not invariably convert to a given volume of cured or plasticized material. If the ratio of the fed and plasticized or cured volumes to the ejected charge volumes increases, the injection cylinder overloads and interferes with the proper operation of the machine. If this ratio decreases the mold is not properly filled with the material.

One of the objects of the present invention is

2 to provide a feed control for the described type of machine and which will satisfactorily keep the machine working properly even though varying volumes of the granular molding material are required to replace the fixed volumes of fluent material ejected from the injection cylinder. Another object is to provide a control working satisfactorily in this fashion in a fully automatic manner so that the operator of the machine does not have to give the feed control problem any attention. A further object is to provide the described type of control so that it is ruggedly constructed of relatively few working parts which are themselves trouble free in operation and capable of providing the control with a long useful service life. Other objects may be inferred from the following.

A specific example of an injection molding machine incorporating the invention is disclosed hereinbelow with the aid of the accompanying drawings for the purpose of explaining the principles and operation of the invention. One possible modification is also described and illustrated hereinbelow and other modifications may be resorted to in the practical use of the invention.

In the accompanying drawings—

Figure 1:
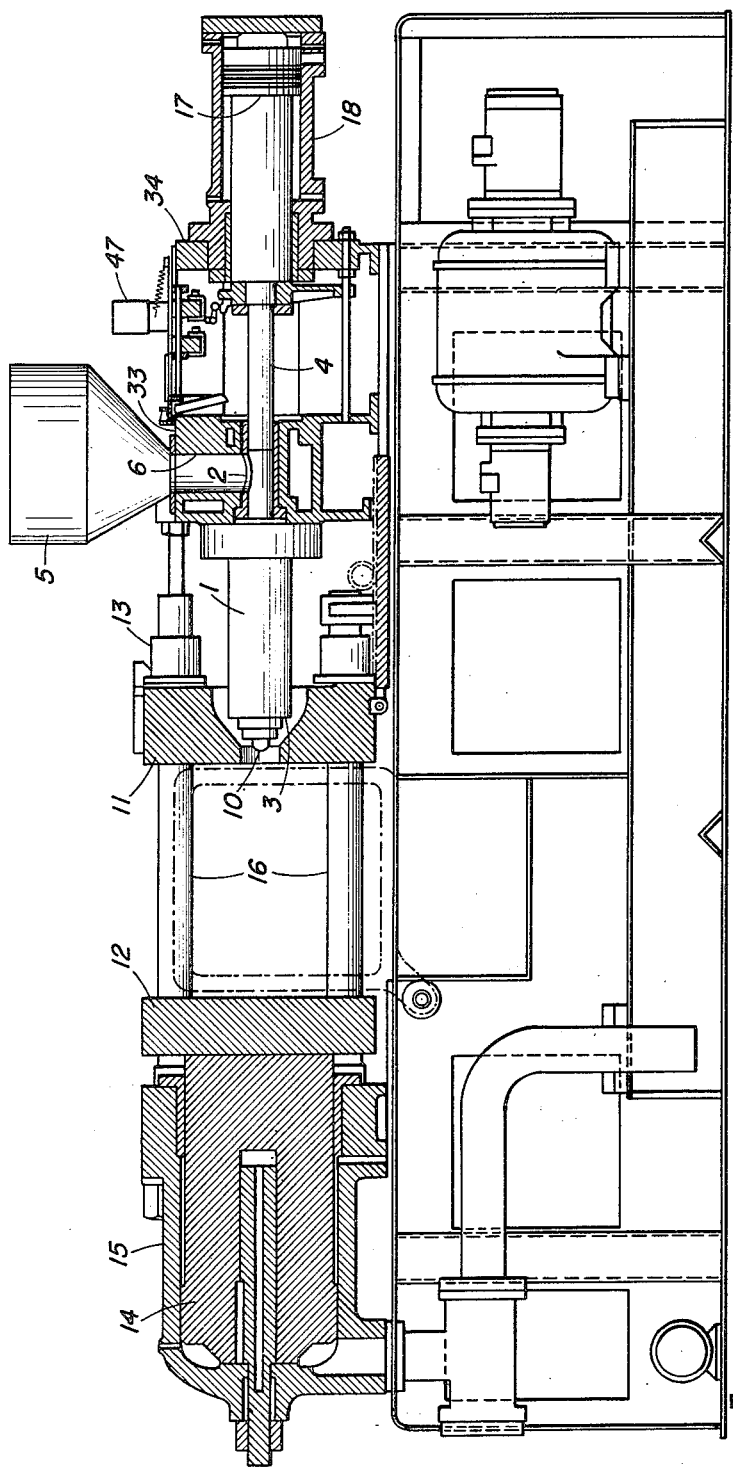
Fig. 1 is a longitudinal, vertical cross section of a modern injection molding machine of the hydraulically operated type and incorporating the invention.
Figure 2:
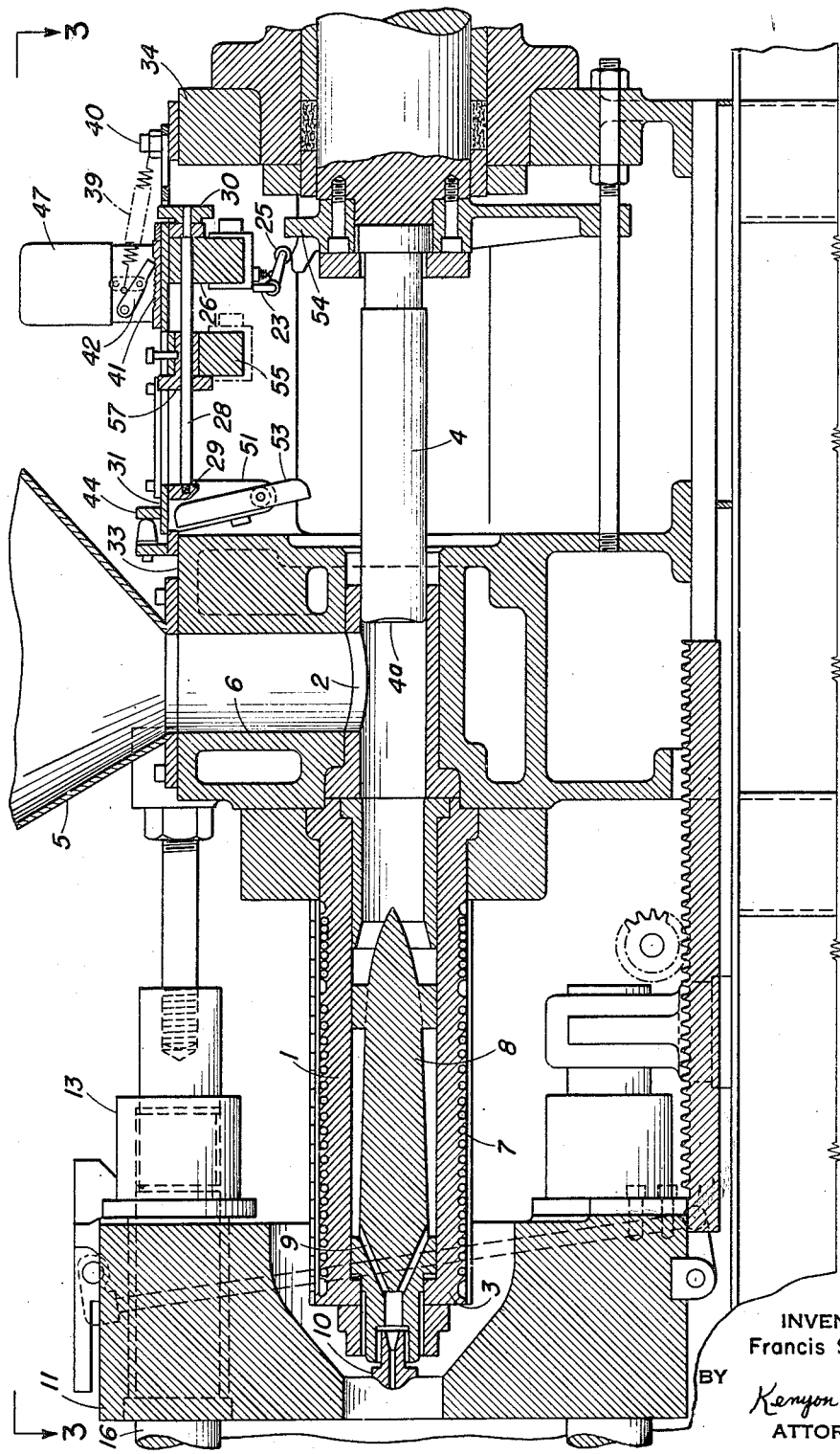
Fig. 2 is an enlargement from a portion of Fig. 1 where the inventive features are embodied and showing the parts on a larger scale and fully in section.
Figure 3:
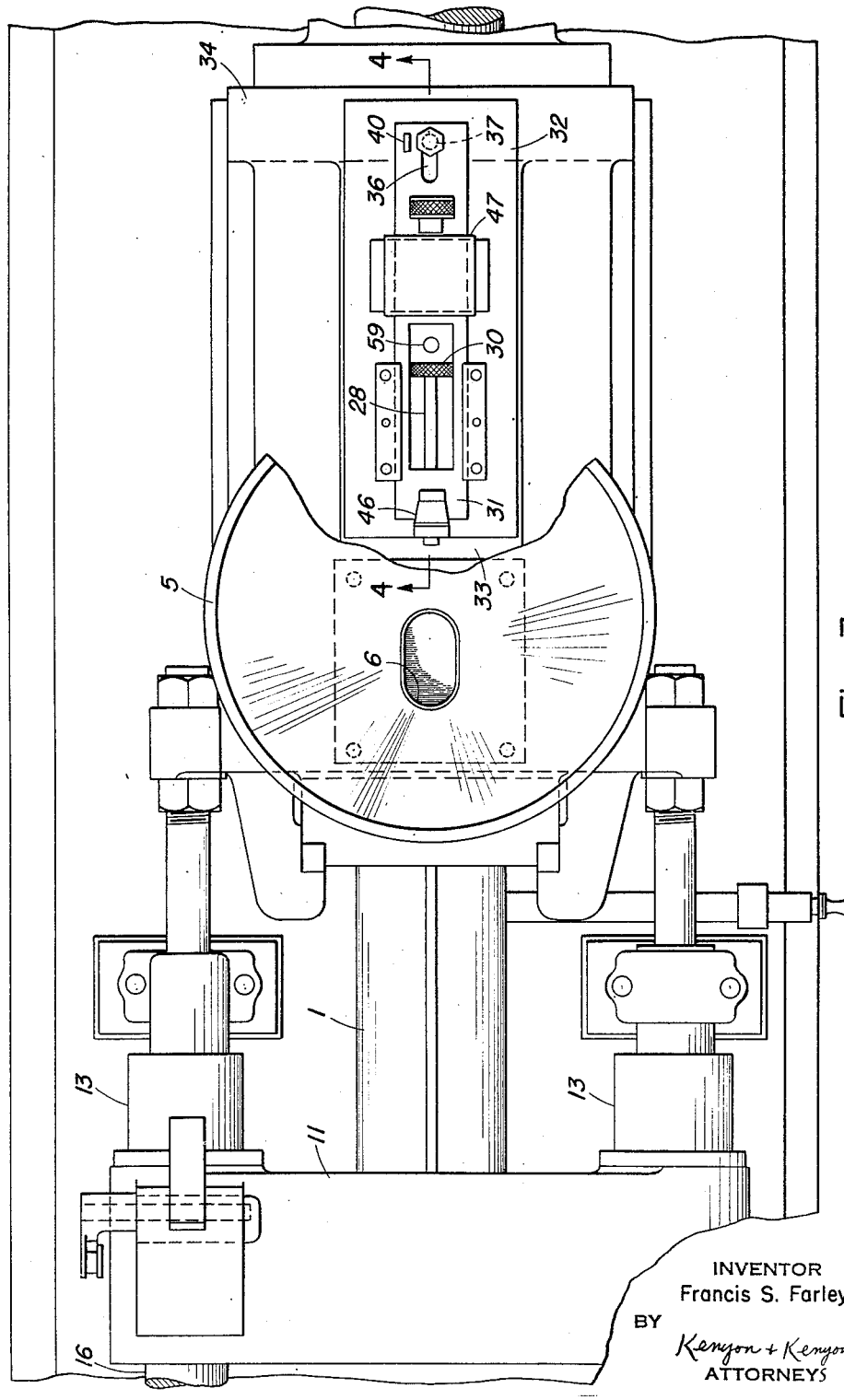
Fig. 3 is a top view looking down on Fig. 2 as indicated by the line 3—3 in Fig. 2.

As previously indicated the illustrated device is an injection molding machine of the type having an injection cylinder 1 with a side feeding port 2 spaced from its discharge end 3 and with an injection plunger 4 that clears the port 2 more or less on its return stroke. In the drawing the plunger 4 is shown at its extreme return limit position where it has fully cleared the port 2. The granular molding material hopper 5 is to contain the granular or uncured molding material and connects with a vertical passage 6 aligned with the feeding port 2 which points upwardly.

With the plunger as shown a maximum amount of the granular molding material may gravitationally run from the bottom of the hopper 5 down the passage 6 through the port 2 and into the inside of the injection cylinder 1. When the machine is in operation, there is molding material in front of the port 2 so that a space is defined between the back end of this mass of material and the front or working end 4a of the plunger 4. When the plunger 4 returns so as to less fully clear the port 2 or to only partially clear it, a smaller space is defined so that less molding material feeds.

The front end portion of the cylinder 1 has an electric resistance heater 7 to define a heating portion wherein the molding material is cured or plasticized when it is pushed forwardly by the plunger 4. A torpedo 8 is positioned inside this curing or heating portion of the cylinder 1 for the purpose of spreading the material into a relatively thin walled tube so it can receive the heat more quickly from the heater 7. Near the cylinder's forward or front end 3 the torpedo 8 has a base through which converging passages 9 extend and which receive the molding material after it has been cured and passes it to an injection nozzle 10 screw fastened to the cylinder's front end 3.

The mold is placed between the clamping platens 11 and 12. The platen 11 reciprocates through a relatively short stroke and is biased to its forward position by cooperating hydraulic cylinders and rams 13. The platen 12 reciprocates through a stroke long enough to accommodate the die placed between the platens. This platen 12 is reciprocated by a double acting hydraulic clamping ram 14 working in a cylinder 15. The drawings show a booster ram and other details which need not be described to understand the principles of the invention.

When the die is placed between the clamping platens 11 and 12 hydraulic pressure is admitted to the cylinder 15 so that the clamping ram 14 advances, clamps the die parts together and pushes the die sprue up against the injection nozzle 10. The platens are guided reciprocatively by guide bars 16. The forward bias of the cooperating cylinders and rams 13 is overcome by the force of the clamping ram 14. When the injection plunger 4 advances a charge of cured or plasticized molding material is injected into the die between the platens 11 and 12 and subsequently the platen 12 is returned so that the die parts may be opened and the resulting injection molding removed, whereupon the platen 12 returns to reclose the die. This occurs successively in rapid succession with the injection plunger 4 advancing to inject a charge into the die each time the dies are closed. High production rates are possible depending on the ability of the machine to operate in a trouble free manner and without requiring too much attention.

As previously explained proper working cannot be obtained by returning the injection plunger 4 to a fixed return limit position on each return stroke, although this may work satisfactorily for intervals of time. The granular molding material feeds gravitationally through the port 2 and its bulk characteristics tend to vary with varying amounts of the material in the hopper 5 and depending on the granular condition of the material and various other factors. Therefore, although a modern injection molding machine such as is illustrated and described here, is provided with very accurate automatic controls for setting the return stroke limit of the injection plunger 4, satisfactory operation cannot continuously result from setting these controls to fix the return limit position of the plunger 4. This is so even though the position selected produced satisfactory working at the time the adjustment was made.

The injection plunger 4 is reciprocated by a double acting hydraulic injection ram 17 working in a cylinder 18 at the opposite end of the machine from the cylinder 15. Customarily the hydraulic circuits required to obtain proper sequential and synchronized operation of the clamp platens 11 and 12 and the injection plunger 4 includes electrically actuated or controlled valves with the various moving parts actuating strategically located limit switches which with timers and the like effect automatic operation. The control system may include a control of the return stroke limit position of the injection plunger 4, which in turn determines the rate at which the molding material is fed to the injection cylinder 1 to replace the material successively ejected as charges of fixed volume due to these charges being ejected into the mold which has a fixed volume.

A conventional way for fixing the return limit position of the injection plunger is by an electric limit switch having an actuator which cooperates with an actuator reciprocated by the injection plunger. When the injection plunger returns the actuator moving with it works or cooperates with the actuator of the limit switch. The limit switch then controls a circuit which actuates an appropriate valve or valves arranged in the hydraulic control circuit to stop the return of the injection ram 17 and therefore fix the return limit position of the injection plunger 4.

Figure 4:
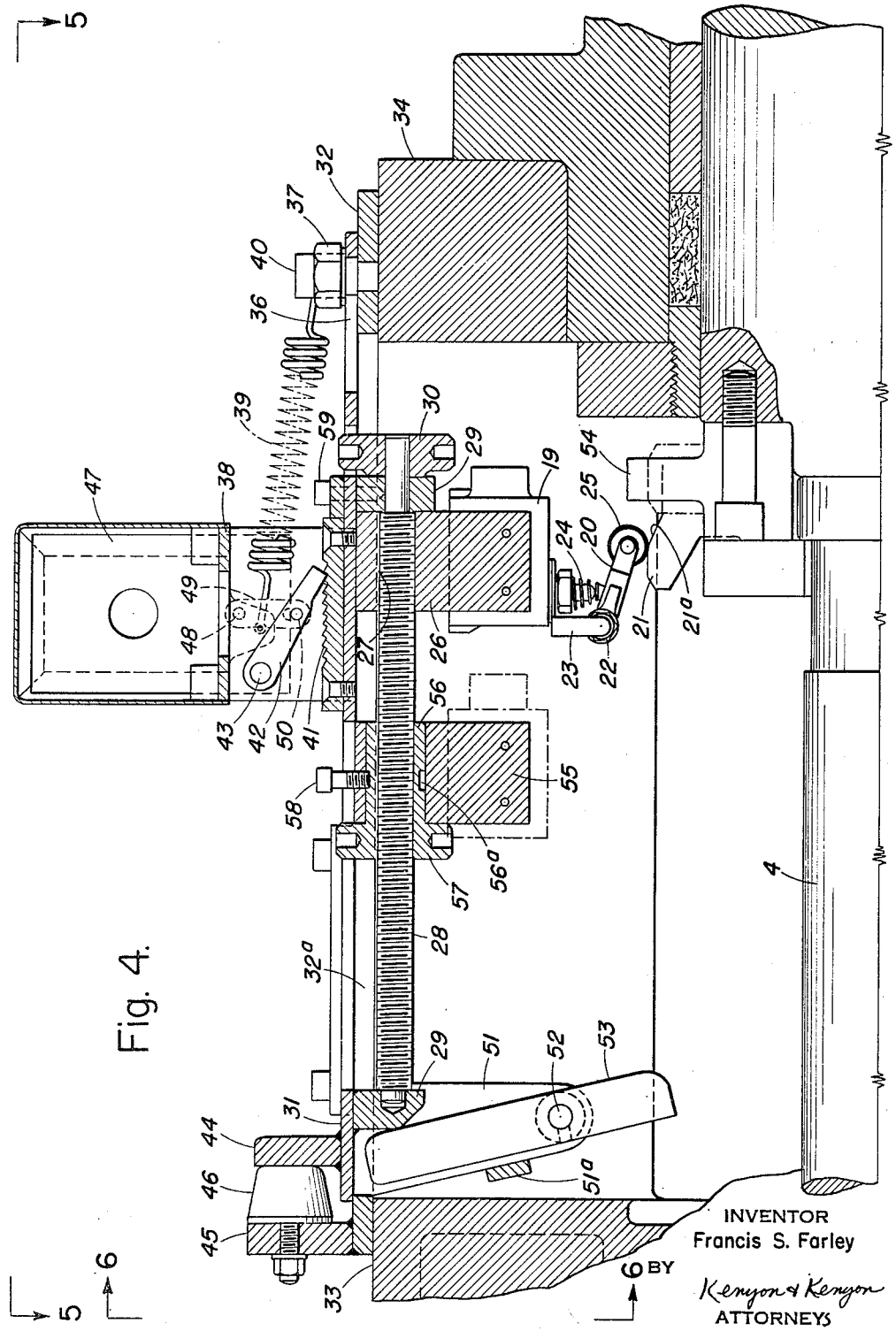
Fig. 4 shows a portion of Fig. 2 restricted largely to parts emphasizing the invention and is on a still larger scale than Fig. 2.
Figure 5:
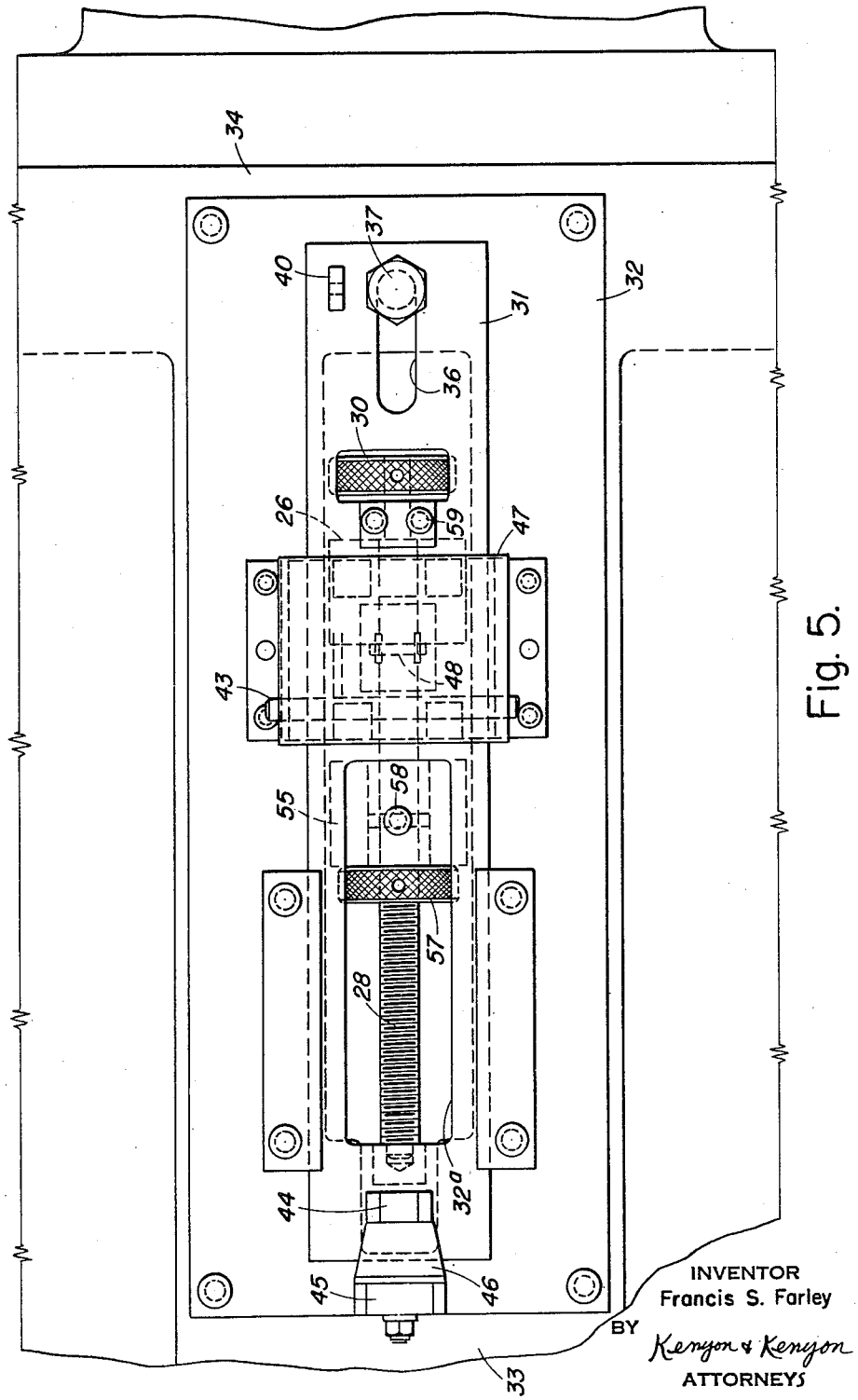
Fig. 5 is a view looking down on Fig. 4 as indicated by the line 5—5 in the latter figure.
Figure 6:
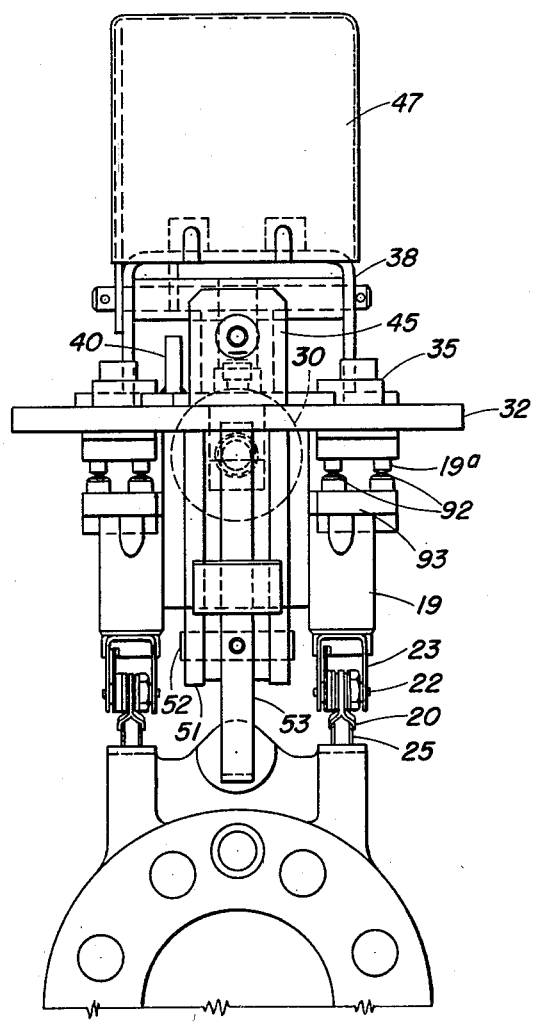
Fig. 6 is an end view of Fig. 4 looking toward the back of the machine as indicated by the line 6—6 in Fig. 4, and Fig. 7 corresponds to Fig. 4, but shows the modification indicating how the principles may be applied by parts differing in form from those shown by Fig. 4.

As shown on the larger scale by Fig. 4 the illustrated form of the present invention uses such a limit switch 19 with this switch provided with an actuator 20 and with the injection plunger 4 rigidly mounting the cooperating actuator 21. The actuator 20 is illustrated as in the form of a lever pivoted at 22 to the arm 23 of a bracket rigidly extending from the limit switch 19 of which only its external housing is illustrated. This limit switch 19 has an operating plunger 24 against which the lever 20 bears. The swinging end of the lever 20 is shown with a roller 25 while the actuator 21 carried by the plunger 4 has its top contoured to provide inclines 21a up and down the rear one of which the roller 25 may ride during the return limit fixing action.

The limit switch 19 functions as a return limit position controller for the injection plunger 4. In prior art arrangements the limit switch 19 is fixed in position but is adjustable back and forth respecting the traveling path of the plunger 4. Therefore the limit switch 19 may be moved to any desired position and when the plunger 4 returns carrying the actuator 21 with it the latter ultimately engages the roller 25 so as to cooperate with the actuator 20 of the limit switch 19 and operate the latter, whereupon the plunger's return stroke terminates and its return limit position is fixed. The return limit position depends, of course, upon the adjusted location of the limit switch 19.

According to the present invention the limit switch 19 is mounted by a depending bracket 26. This bracket has a threaded bore 27 through which the end of a horizontal screw shaft 28 is screwed. This screw shaft is journaled in depending brackets 29. The screw shaft 28 extends parallel to the plunger 4, and one of its ends is provided with a knob 30 for turning it.

The screw shaft brackets 29 depend from a sliding frame 31 which functions as a slide or carriage reciprocating parallel to the reciprocating path of the plunger 4 and arranged above it. The slide or carriage 31 is reciprocatively guided by a suitable guideway which is illustrated as comprising a flat plate 32 which is screw fastened at its front end to the injection cylinder's mounting 33 and at its back end to the front end of the injection ram's cylinder mounting 34. The guiding effect is obtained by the front end of the slide or carriage 31 being embraced by undercut guide bars 35 which are screw fastened to the plate 31 which bridges the space between the injection cylinder's mounting 33 and the injection ram's cylinder mounting 34. At its rear end the slide or carriage 31 has a longitudinally extending slot 36 through which a screw 37 passes. This screw 37 is screwed into the rear end of the stationary plate 32 and may have a smooth shank for the sides of the slot 36 to work against.

In the above fashion the slide or carriage 31 is reciprocatively guided above the reciprocating injection plunger 4. It follows that the position of the limit switch 19 is now determined not only by the adjustment of its mounting bracket 26 by turning of the knob 30, but also by the location of the carriage or slide 31 which mounts the limit switch above the plunger 4. It is to be understood that in all possible positions of the limit switch 19 its actuators 20 and 21 cooperate when they are moved to predetermined relative positions where the cam surface or incline 21a of the actuator 21 lifts the roller 25 of the actuator 20.

A U-shaped bracket or bridge 38 is screw fastened to the standing or stationary plate 32 transversely of the slide or carriage 31 so as to bridge over or span the latter. This bridge 38 functions as an anchorage for a helical tension spring 39 that is fastened to this bridge at one end with its other end anchored to a bracket 40 extending upwardly from the slide or carriage 31. In this fashion the slide or carriage 31 is continuously biased toward one of its reciprocating limits which is in this instance toward its forward reciprocating limit position.

The slide or carriage 31 is adjustably held in any one of a number of positions against the bias of the spring 39 by having a linear ratchet bar 41 screw fastened to it with the ratchet teeth facing upwardly and engaged by a depending pawl 42 pivoted at 43 to the bridge structure 38 which is in turn rigidly supported by the stationary plate 32. The ratchet teeth 41 face oppositely the bias of the spring 39 so that with this slide or carriage 31 at its forward limit the position of the carriage may be adjusted by forcing it backwardly against the bias of the spring 39 to any selected position with the pawl 42 holding it at this position against the bias of the spring 39. When the pawl 42 is released from the ratchet bar 41 the slide or carriage 31 moves forwardly quickly under the bias of the spring 39. The forward limit of the reciprocating carriage or slide 31 is fixed by providing the latter with an upstanding abutment 44 and by fixing an upstanding stop plate 45 to the stationary plate 32 so that the two parts may interengage when the slide 31 moves forwardly. A rubber bumper plug 46 is shown screw fastened to the stop plate 45 for the purpose of absorbing the stopping shock more gradually.

The horizontal portion of the bridge 38 mounts a solenoid 47 provided with a reciprocated armature having a lower end pivot connection 48 with a link 49 which is pivoted to the swinging pawl 42 at 50. The solenoid and its reciprocating armature may be one of the commercial units provided for the remote controlling of various devices. Any suitable remote control device may be used to raise the pawl 42 to release it from the ratchet 41 so that the slide or carriage 31 is thrown forwardly by the force of the tension spring 39.

Laterally spaced arms 51 depend from the forward portion of the stationary plate 32 close to and behind the injection cylinder mounting 33. These arms 51 mount a horizontal shaft 52 between them and on which a two-armed lever 53 is mounted for rotative or swinging action about the axis of the shaft 52. The upper arm of this lever 53 extends to a position adjacent the bottom of the slide or carriage 31. The front end of the forward one of the depending brackets or supports 29 in which the screw shaft 28 is journaled is positioned to be engaged by this upper lever arm of this lever 53. The lower lever arm of this lever 53 extends downwardly to provide an actuator and the injection plunger 4 carries a cooperating actuator 54 positioned to engage the lower arm of the lever 53 when the injection plunger moves toward its advance limit position.

When the actuators comprising the lever 53 and the upstanding one 54 fixed to the plunger 4 interengage, the actuator 53 pushes the lower lever arm of the lever 53 forwardly so that its upper lever arm pushes backwardly on the depending bracket or arm part 29 so that the carriage or slide 31 is shifted backwardly. Thus the lever 53 functions as a direction reversing mechanism. When the injection plunger reaches its advance limit position it is stopped by its front end working against the injection molding material in the injection cylinder 1. This automatically shifts the limit switch 19 backwardly to a position determined by the advance limit position of the injection plunger and thereby fixes the injection plunger return limit position. Since the actuators 53 and 54 interengage only as the plunger adjacently approaches its advance limit range, the carriage or slide shifting is kept at a minimum.

The drawings illustrate two of the actuators 21 arranged on either side of the center line of the injection plunger 4 with the actuator 54 arranged on the center line and the actuator comprising the lower arm of the lever 53 consequently being shown as centrally positioned. The depending bracket or arm 26 mounting the limit switch 19 is offset so that one of the actuators 21 can cooperate with the actuator 20 of this limit switch 19.

A second depending bracket 55 also depends from the carriage 31 in a horizontally reciprocative manner and is adjustably positioned by being associated with a rotative nut 56 having an operating knob 57 and which is in screw threaded association with the screw shaft 28. This nut 56 has a groove 56a in which a combination retaining and locking screw 58 has its lower end fitted, this screw being threaded through a hole in the bracket 55. By rotating the nut 56 the depending bracket 55 may be shifted longitudinally of the plunger 4 and relative the bracket 26 while rotation of the shaft 28 with the screw 58 tightened shifts both of the brackets 26 and 55 simultaneously and proportionately. A set screw 59 is shown for locking the shaft 28 against rotation.

The stationary plate 32 has a longitudinally extending slot 32a up through which the upper portion of the brackets 26 and 55 extend with the depending arm 29 extending downwardly through this slot 32a. At the back end of the carriage or slide plate 31 there is a slot 36 and the shank of the screw 37 extends through this slot. The carriage or plate 31 extends laterally beyond the slot 32a so it rests on the top of the plate 32 and is thus provided with a smooth bearing surface for sustaining the weight of the reciprocating parts and providing adequate sliding bearing surfaces for this weight.

In the operation of the illustrated machine initial setting up is done by reciprocating the plunger 4 back and forth to load the front portion of the injection cylinder 1 with the granular material. When this is loaded time is provided for curing or plasticizing or in other words conversion of the granular material to its compressed plastic fluent condition. This curing or plasticizing is effected by the heat from the heater 7 and if desired by the use of some pressure exerted by the plunger 4. The platens 11 and 12 are closed by sending hydraulic pressure to the advance end of the ram 14 and of course the die is in position between these platens with its sprue pushed against the injection nozzle 10. Assuming the machine to be provided with full automatic controls it may be run through a few cycles to get things started.

The knob 30 is turned to adjust the depending bracket or arm 26 to a position where the limit switch 19 is located to fix the return stroke limit position of the injection plunger 4 at a position experience has indicated feeds on the average a proper load of the granular molding material into the injection cylinder. If a curing cycle phase in the complete cycle is desired a duplicate of the limit switch 19 and its various actuators parts may be mounted by the depending bracket 55 and this limit switch may be wired into the circuit so that when the injection plunger is returned by its ram 17 to its return stroke limit it is promptly readvanced to an intermediate position so as to feed in the load just picked up until this load engages the material in the injection cylinder 1 and applies some pressure to it to accelerate or aid in the curing. The compacting action applied the material during this curing phase may be controlled by working the knob 57 to adjust the position of the depending arm or bracket 55 which adjusts the relative position of the limit switch used for this purpose. It is to be understood that this is done only when pressure curing is desired.

As operation proceeds through each cycle the injection ram 4 goes forwardly carrying its actuator 54 with it which engages the actuator provided by the lower end of the lever 53 so as to shift the carriage or slide 31 backwardly to a position fixed by the advance stroke limit position of the ram 4. This shifts the limit switch 19 backwardly to a position where it is held against the returning bias of the spring 39 by the pawl 42 engaging in the ratchet 41. Therefore the return limit position of the ram is fixed each time in its extent by the extent of the plunger's advance limit position on its immediately preceding advance stroke.

Nof if the granular molding material that feeds through the port 2 as the plunger front end 4a of the plunger 4 clears this port an amount determined by the setting of the limit switch 19, has a fixed volumetric relation to the charge of plasticized or cured material ejected from the cylinder through the nozzle 10 into the mold of fixed volumetric capacity, then the limit switch 19 always returns to the same position it had at the preceding cycle. What happens in effect is that each time the plunger 4 goes forwardly it measures the ratio between the fixed constant volume of the successively ejected charges and the volumes of the loads fed through the port 2 after their conversion, curing or plasticizing to a fluent mass and prior to their ejection from the cylinder 1. This ratio remains constant only so long as the granular material feeding through the port 2 as successive loads are of such a character that it cures or plasticizes in the cylinder 1 to a fluid volume exactly equaling that required to fill the mold between the platens 11 and 12, it being understood that the same mold is repeatedly used.

Since it is impossible to obtain granular molding material of absolutely uniform volume to weight characteristics or to feed it so that the above ratio remains fixed, it eventually happens that the ratio changes. If the granular molding material cures or plasticizes to a fluent mass of less volume than is required to fill the mold, the advance limit position of the injection plunger 4 starts to shift forwardly. This is permissible within a reasonable range but cannot go on continuously because eventually the plunger 4 cannot be advanced any farther because of the limitations imposed by the torpedo 8 and by the reciprocation limits of the injection ram 17. As this forward shift starts the actuator 54 on the plunger 4 pushes the limit switch 19, by pushing the carriage 31, to a slightly farther back position than it had for the preceding stroke or strokes. This shifts the injection plunger's return limit position backwardly and permits the feeding of a load of slightly larger volume. Obviously this overcomes the forward shifting tendency respecting the advance limit position of the injection plunger 4.

Should the granular material tend to plasticize or cure in such a manner that each load produces more plastic mass than is ejected through the nozzle 10 at each cycle, then the advance limit position of the plunger 4 tends to gradually shift backwardly. Then the actuator 54 carried by the plunger 4 cannot shift the carriage 31 and hence the limit switch 19 quite so far backwardly as it did before. Therefore the return limit position of the plunger 4 is not extended so far as it was before. That is to say its return stroke position is restricted. Consequently the volume of each load fed through the port 2 is correspondingly restricted and the backward shifting tendency is overcome respecting the advance limit position of the plunger 4 as it repeats cycle after cycle in its injection molding operations.

It is to be understood that the disclosed feed control works automatically whether the machine is under full automatic, semi-automatic or manual control. Those skilled in the art are familiar with the control systems of injection molding machines of the disclosed type. At the end of each cycle as the injection plunger 4 starts to advance the solenoid 47 may be energized to pull up on the link 48 so as to release the pawl 42 from the ratchet 41. This permits the carriage or slide 31 to move forwardly which it does with a snap action and at high speed, the bumper 46 taking up the shock. This bangs the upper end of the lever 53 forwardly so a crossbar 51a is shown between the depending arms 51 for restricting swinging of this lever 53. Any oscillation of this lever 53 is immediately stopped when the actuator 54 engages it and pushes its lower end forwardly with its upper end reacting against the bias of the tension spring 39. The solenoid 47 may be wired into any conventional fully automatic or semi-automatic control circuit so as to release the pawl 42 at the appropriate time during each cycle. In the case of manual control the solenoid 47 can be controlled by a manually operated switch.

The extent of compacting applied during a curing cycle, when pressure curing is desired to accelerate the plasticizing of the molding material, may be effected by the use of a limit switch applied to the bracket 55 as previously indicated. Obviously the compacting will be uniform because the intermediate or curing position of the plunger 40 will shift as required by the plasticizing characteristics of the granular molding material of the successive loads. The use of the knob 57 permits adjustment of the compacting obtained by moving the bracket 55 independently of the bracket 26.

It is apparent that the principles involved by this illustrative example may be modified. One possible modification is disclosed by Fig. 7 and described below.

In this modification shown by Fig. 7 the mounting 34 for the injection ram cylinder has a hole 60 formed in it and has an upstanding bracket 61 screw fastened to its back. This bracket 61 has a hole 62 aligned with the hole 60 and is provided with a bushing 63 in which a reciprocative rod 64 is arranged. This rod 64 extends forwardly through the hole 60 and over the injection plunger which cannot be seen in Fig. 7, but which is below the rod 64. An actuator 65 extends upwardly from the injection plunger and has a hole 66 in which there is a bushing 67 and in which the rod 64 is arranged. The bushings 63 and 67 serve to guide the reciprocating rod 64 and to hold it steady. The front end of the rod 64 is provided with a flange 65a fixed to it and adapted to be engaged by the actuator 65 so that the rod 64 is pulled forwardly as the injection plunger advances. Thus this flange 65a functions as a cooperating actuator with the part 65.

At its back end the bar 64 is pivoted to a two-armed lever 68 which is mounted by a shaft 69 carried by a stub arm 70 projecting laterally from the back of the bracket 61. When the bar 64 is pulled forwardly as the injection plunger approaches the end of its advance stroke limit, the upper arm of the lever 68 moves backwardly. This upper end is connected at 69a to an adjusting bar 71 which extends forwardly and mounts the limit switch 19 or its equivalent. The bar 71 is guided horizontally by a guideway 72 positioned by a horizontal shelf 73 extending forwardly from the upstanding bracket 61. A helical tension spring 74 is connected to the shelf strut at 75 and to the upper arm of the lever 68 at 76 so the bar 71 is continuously biased forwardly.

The end of the shaft 71 is screw threaded at 77 and the connection between the bar and the lever 68 is in the form of a pin or pivot indicated at 69a which projects from a collar 78 connected with a nut 79 which can be screwed back and forth on the threaded portion 77 of the shaft 71. This provides an adjustment comparable to the adjustment obtained by working the knob 30 of the form shown by the preceding figures. A lock nut 80 is provided to fix the adjustment securely during the operation of the machine.

Instead of a ratchet the bar 71 in this instance is locked in the position to which it is set by the advance limit position of the injection plunger, by means of a friction lock 81 in the form of a plunger working downwardly to press against the top of the bar 71, which may be flattened as at 71a to provide for good friction locking or braking action. A helical coil spring 82 surrounds the plunger 81 and the latter is passed through a downwardly pointed crosshead 83 adjustably held by a nut 84 and lock nut 85 screwed on the threaded upper end of this plunger. The plunger is positioned by being passed through a hole formed in the short arm of a two-armed lever 86 providing V-shaped seats 87 for the pointed edge of the crosshead 83. The long arm of this lever 86 extends backwardly above the shelf 73 where it is secured by a link 88 to the armature plunger 89 of a solenoid 90. The spring 82 functions as a compression spring keeping the knife edges of the crosshead 83 and the seat 87 in firm interengagement. When the solenoid 90 is energized its armature plunger 89 is pulled upwardly so as to push downwardly on the compression spring 82 and force the plunger 81 to locking position respecting the bar 71.

The operation of this modification should be relatively obvious from what was previously described, so its description will be made brief. The initial adjustment is obtained by operation of the adjusting nut 79. This positions the limit switch 19 so that when the actuator 65 engages the roller 25 of the actuator 20 the injection plunger's return is halted. On the next advance stroke the actuator 65 moves forwardly with its bushing 67 sliding freely over the rod 64 until the actuator 65 is engaged so as to pull the bar 64 forwardly. This pulls the limit switch 19 backwardly against the bias of its spring 74 until the advance stroke limit is reached. At this time the solenoid 90 must be energized so as to push down on the plunger 81 and lock or brake the bar 71 firmly at its adjusted position. Then on its return stroke the actuator 65 again engages the roller 25 and actuator 20 of the limit switch 19 so that the plunger's return stops.

In this instance no provision is made for the second limit switch required for pressure curing but it is obvious that an extension could be placed on the bar 71 to mount a second limit switch if such pressure curing or plasticizing is desired.

At the appropriate time the solenoid 90 is de-energized so that the bar 71 can be thrust forwardly by the bias of the spring 74 with the limit switch then being pulled backwardly to a properly compensated position determined by the advance limit position of the injection plunger.

In this instance the solenoid 90 is mounted by posts 91. The friction brake substitutes for the ratchet and pawl of the preceding example. Other specific details are changed in the case of this second example or modification while preserving the fundamental features of the invention as illustrated by the first example. The two examples serve to illustrate how those skilled in the art may vary the constructional details while retaining the fundamental principles and operation of the invention.

Other details may differ. For example in the modification shown by Fig. 7 the necessary electrical circuit connection through the switch 19 may be effected by lead wires. In the case of the first example shown by the figures preceding Fig. 7 the limit switches 19 are provided with contactors 19a which slide over slip bars 92 which maintain electrical contact while the contactors 19a reciprocate thereover. The slip bars 92 are shown mounted by bridges 93 mounted by the mounting 34 for the injection ram cylinder and by the injection cylinder's mounting 33.

It is apparent from the foregoing that either example, and particularly that shown by Figs. 1 through 6 which is the preferred form of the invention, are capable of providing a fully automatic feed control for the described type of injection molding machine. The parts may be made simple, rugged and foolproof. Initial manual setting of the return stroke limit is easily made in either instance. Thereafter when the machine is in operation the granular molding material loads are increased or decreased as required to keep the injection plunger reciprocating within its proper and operative reciprocative range.

I claim:

1. Apparatus for successively receiving and discharging material, said apparatus including a cylinder having a discharge passage and a side loading port spaced backwardly from said passage, a plunger having an end reciprocating in said cylinder and having advance and return limit positions, said end and port being constructed and arranged so that said end clears said port varying amounts depending on said plunger's return limit position, adjustable means for stopping said plunger at its return limit position, and means for adjusting said adjustable means prior to said plunger's return to its return limit position and substantially in proportion to said plunger's preceding advance limit position.

2. Apparatus for successively receiving and discharging material, said apparatus including a cylinder having a discharge passage and a side loading port spaced backwardly from said passage, a plunger having an end reciprocating in said cylinder and having advance and return limit positions, said end and port being constructed and arranged so that said end clears said port varying amounts depending on said plunger's return limit position, first and second actuators arranged for movement through interassociated paths, means for stopping said plunger at its return limit position when said actuators are at predetermined relative positions, means for moving said first actuator to a position determined by said plunger's advance limit position when said plunger moves to said advance limit position, means for holding said first actuator against moving from said position determined by said actuator while said plunger moves to its return limit position, and means for moving said second actuator substantially in proportion to said plunger's movement to its return limit position.

3. Apparatus for successively receiving and discharging material, said apparatus including a cylinder having a discharge passage and a side loading port spaced backwardly from said passage, a plunger having an end reciprocating in said cylinder and having advance and return limit positions, said end and port being constructed and arranged so that said end clears said port varying amounts depending on said plunger's return limit position, a reciprocating actuator connected to said plunger and reciprocating therewith, a movable carriage, a linear guide arranged to guide said carriage reciprocatively substantially parallel to the reciprocating movement of said reciprocating actuator, an actuator mounted on said carriage and moving therewith, means responsive to movement of said actuators to predetermined relative positions for stopping said plunger at its return limit position, and means for interconnecting said carriage with said plunger when said plunger moves towards its advance limit position and for moving said carriage substantially in proportion to said plunger's movement to its advance limit position.

4. Apparatus for successively receiving and discharging material, said apparatus including a cylinder having a discharge passage and a side loading port spaced backwardly from said passage, a plunger having an end reciprocating in said cylinder and having advance and return limit positions, said end and port being constructed and arranged so that said end clears said port varying amounts depending on said plunger's return limit position, a reciprocating actuator connected to said plunger and reciprocating therewith, a movable carriage, a linear guide arranged to guide said carriage reciprocatively substantially parallel to the reciprocating movement of said reciprocating actuator, an actuator mounted on said carriage and moving therewith, means responsive to movement of said actuators to predetermined relative positions for stopping said plunger at its return limit position, means for interconnecting said carriage with said plunger when said plunger moves towards its advance limit position and for moving said carriage substantially in proportion to said plunger's movement to its advance limit position, means for biasing said carriage to move in a direction opposite to the direction of its movement by said interconnecting means, releasable means for holding said carriage against movement in said opposite direction by said biasing means while permiting said carriage to move in the direction of its movement by said interconnecting means, and means for releasing said lock before advances of said plunger fully to its advance limit position.

5. A machine for successively receiving loads of granular plastic and ejecting charges of plasticized plastic, said machine including a plasticizing and ejecting cylinder having a discharge passage and a side loading port spaced backwardly therefrom, a plunger having an end reciprocating in said cylinder with an advance to a shifting advance limit position and a return to a shiftable return limit position, said end and said port being constructed and arranged so that said end variably clears said port when at said return limit position so that said port passes decreasing loads as said return limit position is shifted forwardly and increasing loads as said return limit position is shifted backwardly, a reciprocative shiftable mounting arranged to reciprocatively shift in forward and backward directions substantially parallel to said plunger, a limit switch for controlling said return limit position and having an extending switch actuator and which is mounted on said mounting so as to shift therewith, actuating means connected to said plunger so as to move therewith, said switch actuator and said actuating means being constructed and arranged to coact when said plunger returns to said return limit position, and means for shifting said mounting substantially in reverse proportion to shifting of said advance limit position of said plunger.

6. A machine for successively receiving loads of granular plastic and ejecting charges of plasticized plastic, said machine including a plasticizing and ejecting cylinder having a discharge passage and a side loading port spaced backwardly therefrom, a plunger having an end reciprocating in said cylinder with an advance to a shifting advance limit position and a return to a shiftable return limit position, said end and said port being constructed and arranged so that said end variably clears said port when at said return limit position so that said port passes decreasing loads as said return limit position is shifted forwardly and increasing loads as said return limit position is shifted backwardly, a reciprocative shiftable mounting arranged to reciprocatively shift in forward and backward directions substantially parallel to said plunger, a limit switch for controlling said return limit position and having an extending switch actuator and which is mounted on said mounting so as to shift therewith, actuating means connected to said plunger so as to move therewith, said switch actuator and said actuating means being constructed and arranged to coact when said plunger returns to said return limit position, a shifting actuator for said mounting constructed and arranged to interengage with said actuating means when said plunger advances to said advance limit position, and motion reversing means interconnecting said shifting actuator and said mounting for imparting shifting motion of said actuator reversely to said mounting.

7. A machine for successively receiving loads of granular plastic and ejecting charges of plasticized plastic, said machine including a plasticizing and ejecting cylinder having a discharge passage and a side loading port spaced backwardly therefrom, a plunger having an end reciprocating in said cylinder with an advance to a shifting advance limit position and a return to a shiftable return limit position, said end and said port being constructed and arranged so that said end variably clears said port when at said return limit position so that said port passes decreasing loads as said return limit position is shifted forwardly and increasing loads as said return limit position is shifted backwardly, a reciprocative shiftable mounting arranged to reciprocatively shift in forward and backward directions substantially parallel to said plunger, a limit switch for controlling said return limit position and having an extending switch actuator and which is mounted on said mounting so as to shift therewith, actuating means connected to said plunger so as to move therewith, said switch actuator and said actuating means being constructed and arranged to coact when said plunger returns to said return limit position, a shifting actuator for said mounting constructed and arranged to interengage with said actuating means when said plunger advances to said advance limit position and to separate during the return of said plunger.

8. A machine for successively receiving loads of granular plastic and ejecting charges of plasticized plastic, said machine including a plasticizing and ejecting cylinder having a discharge passage and a side loading port spaced backwardly therefrom, a plunger having an end reciprocating in said cylinder with an advance to a shifting advance limit position and a return to a shiftable return limit position, said end and said port being constructed and arranged so that said end variably clears said port when at said return limit position so that said port passes decreasing loads as said return limit position is shifted forwardly and increasing loads as said return limit position is shifted backwardly, a reciprocative shiftable mounting arranged to reciprocatively shift in forward and backward directions substantially parallel to said plunger, a limit switch for controlling said return limit position and having an extending switch actuator and which is mounted on said mounting so as to shift therewith, actuating means connected to said plunger so as to move therewith, said switch actuator and said actuating means being constructed and arranged to coact when said plunger returns to said return limit position, a shifting actuator for said mounting constructed and arranged to interengage with said actuating means when said plunger advances to said advance limit position and to separate during the return of said plunger, motion reversing means interconnecting said shifting actuator and said mounting for imparting shifting motion of said actuator reversely to said mounting, means for biasing said mounting to shift in its forward direction, releasable means for locking said mounting against shifting forwardly during said plunger's return, and means operative after said plunger returns to its return limit position for releasing said releasable means to unlock said mounting.

9. A machine for receiving and discharging material, said machine including a cylinder having a discharge end, a plunger end reciprocatively arranged in said cylinder and facing said discharge end, power means for moving said plunger end backwardly to a return position providing space in said cylinder for receiving material and forwardly to an advance position forcing the material out through said discharge end, said advance position being variably located depending on the proportioning of the volume of material loaded into said space to the volume of material forced out through said discharge end, means for loading material into said space, movable means for varying the volume of the material loaded into said space by said loading means, and control means for moving said movable means an amount responsive to and determined by the location of said plunger end when it is at said advance position.

10. A machine for receiving and discharging material, said machine including a cylinder having a discharge end, a plunger end reciprocatively arranged in said cylinder and facing said discharge end, power means for moving said plunger end backwardly to a return position providing space in said cylinder for receiving material and forwardly to an advance position forcing the material out through said discharge end, said advance position being variably located depending on the proportioning of the volume of material loaded into said space to the volume of material forced out through said discharge end, means for loading material into said space, movable means for varying the volume of the material loaded into said space by said loading means, and control means for moving said movable means and amount responsive to and determined by the location of said plunger end when it is at said advance position, said movable means having biasing means for biasing it to move to a predetermined position from which it may be moved against the bias by said control means, releasable means for latching said movable means against movement by said biasing means in the position in which said movable means is moved by said control means, and means for releasing said releasable means.

11. A plastic injection molding machine including a plasticizing and ejecting cylinder having a discharging passage and a side providing a loading port spaced backwardly from said passage, a reciprocative plunger having a forward end positioned in said cylinder and a backward portion extending backwardly from said forward end and out of said cylinder, powered means for advancing said plunger to an advance limit position causing said plunger's forward end to discharge plasticized plastic through said passage and for returning said plunger to a return limit position where said plunger's forward end clears said loading port varying amounts depending on the location of said return limit position, means for feeding unplasticized plastic through said port to load said cylinder with the unplasticized plastic, actuator means mounted on said plunger's backward portion so as to move therewith, a limit switch having an actuator and adapted to control said powered means to stop its return of said plunger at said return limit position, a shiftable mounting to which said switch is attached, a guide constructed and arranged to guide said mounting reciprocatively substantially parallel to the motion of said actuator means and with said switch's actuator positioned for engagement by said actuator means when said plunger returns to its return limit position, a shiftable actuator positioned for engagement and forward shifting by said actuator means when said plunger advances to its advance limit position, and means connecting said shiftable actuator to said shiftable mounting and for transferring forward shifting motion of said shiftable actuator reversely to said shiftable mounting.

12. A plastic injection molding machine including a plasticizing and ejecting cylinder having a discharging passage and having a side providing a loading port spaced backwardly from said passage, a reciprocative plunger having a forward end positioned in said cylinder and a backward portion extending backwardly from said forward end and out of said cylinder, powered means for advancing said plunger to an advance limit position causing said plunger's forward end to discharge plasticized plastic through said passage and for returning said plunger to a return limit position where said plunger's forward end clears said loading port varying amounts depending on the location of said return limit position, means for feeding unplasticized plastic through said port to load said cylinder with the unplasticized plastic, actuator means mounted on said plunger's backward portion so as to move therewith, a limit switch having an actuator and adapted to control said powered means to stop its return of said plunger at said return limit position, a shiftable mounting to which said switch is attached, a guide constructed and arranged to guide said mounting reciprocatively substantially parallel to the motion of said actuator means and with said switch's actuator positioned for engagement by said actuator means when said plunger returns to its return limit position, a shiftable actuator positioned for engagement and forward shifting by said actuator means when said plunger advances to its advance limit position, and a two-armed lever having a fulcrum between its respective ends and with one of said ends connected to said shiftable actuator and the other connected to said shiftable mounting.

13. A plastic injection molding machine including a plasticizing and ejecting cylinder having a discharging passage and having a side providing a loading port spaced backwardly from said passage, a reciprocative plunger having a forward end position in said cylinder and a backward portion extending backwardly from said forward end and out of said cylinder, powered means for advancing said plunger to an advance limit position causing said plunger's forward end to discharge plasticized plastic through said passage and for returning said plunger to a return limit position where said plunger's forward end clears said loading port varying amounts depending on the location of said return limit position, means for feeding unplasticized plastic through said port to load said cylinder with the unplasticized plastic, actuator means mounted on said plunger's backward portion so as to move therewith, a limit switch having an actuator and adapted to control said powered means to stop its return of said plunger at said return limit position, a shiftable mounting to which said switch is attached, a guide constructed and arranged to guide said mounting reciprocatively substantially parallel to the motion of said actuator means and with said switch's actuator positioned for engagement by said actuator means when said plunger returns to its return limit position, a shiftable actuator positioned for engagement and forward shifting by said actuator means when said plunger advances to its advance limit position, and means connecting said shiftable actuator to said shiftable mounting and for transferring forward shifting motion of said shiftable actuator reversely to said shiftable mounting, said shiftable mounting having a forward limit position and having means for biasing it to shift forwardly to said position, and means for locking said shiftable mounting against forward movement while said plunger returns from its advance limit position to its return limit position.

14. A plastic injection molding machine including a plasticizing and ejecting cylinder having a discharging passage and having a side providing a loading port spaced backwardly from said passage, a reciprocative plunger having a forward end positioned in said cylinder and a backward portion extending backwardly from said forward end and out of said cylinder, powered means for advancing said plunger to an advance limit position causing said plunger's forward end to discharge plasticized plastic through said passage and for returning said plunger to a return limit position where said plunger's forward end clears said loading port varying amounts depending on the location of said return limit position, means for feeding unplasticized plastic through said port to load said cylinder with the unplasticized plastic, actuator means mounted on said plunger's backward portion so as to move therewith, a limit switch having an actuator and adapted to control said powered means to stop its return of said plunger at said return limit position, a shiftable mounting to which said switch is attached, a guide constructed and arranged to guide said mounting reciprocatively substantially parallel to the motion of said actuator means and with said switch's actuator positioned for engagement by said actuator means when said plunger returns to its return limit position, a shiftable actuator positioned for engagement and forward shifting by said actuator means when said plunger advances to its advance limit position, and a two-armed lever having a fulcrum between its respective ends and with one of said ends connected to said shiftable actuator and the other to said shiftable mounting, said shiftable mounting having a forward limit position and having means for biasing it to shift forwardy to said position, and means for locking said shiftable mounting against forward movement while said plunger returns from its advance limit position to its return limit position.

FRANCIS S. FARLEY.

REFERENCES CITED

The following references are of record in the file of this patent:

UNITED STATES PATENTS

| Number | Name | Date |
|---|---|---|
| 2,033,735 | Pack | Mar. 10, 1936 |
| 2,361,432 | Stacy | Oct. 31, 1944 |
| 2,404,559 | Ashbaugh | July 23, 1946 |
| 2,438,857 | Knowles | Mar. 30, 1948 |